US011480852B2

(12) United States Patent
Yin et al.

(10) Patent No.: US 11,480,852 B2
(45) Date of Patent: Oct. 25, 2022

(54) CAMERA MODULE AND ELECTRONIC APPARATUS (71) Applicant: Beijing Xiaomi Mobile Software Co., Ltd., Beijing (CN)

(72) Inventors: Zhidong Yin, Beijing (CN); Jingmin Feng, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 473 days.

(21) Appl. No.: 16/146,856

(22) Filed: Sep. 28, 2018

(65) Prior Publication Data
US 2019/0101810 A1    Apr. 4, 2019

(51) Int. Cl.
*G03B 17/17* (2021.01)
*G02B 13/00* (2006.01)
*G02B 13/06* (2006.01)
*G02B 17/08* (2006.01)
*G02B 13/16* (2006.01)
*G02B 5/04* (2006.01)

(52) U.S. Cl.
CPC ........... *G03B 17/17* (2013.01); *G02B 13/007* (2013.01); *G02B 13/0065* (2013.01); *G02B 13/06* (2013.01); *G02B 13/16* (2013.01); *G02B 17/086* (2013.01); *G02B 5/04* (2013.01)

(58) Field of Classification Search
CPC ...... G02B 13/0065; G02B 13/06; G02B 5/04; G02B 13/16; G02B 17/086; G02B 13/007; G03B 17/17
USPC ................. 359/643–647, 726, 732–737, 809
See application file for complete search history.

(56) References Cited

U.S. PATENT DOCUMENTS

| | | | | |
|---|---|---|---|---|
| 10,288,850 B2* | 5/2019 | Ko | ........................... | G02B 5/04 |
| 10,437,022 B2* | 10/2019 | Yao | .................... | G02B 13/0065 |
| 10,437,023 B2* | 10/2019 | Yao | .................... | G02B 13/0035 |
| 11,340,388 B2* | 5/2022 | Shigemitsu | ........ | G02B 13/0085 |
| 2003/0011892 A1* | 1/2003 | Hall | ........................ | G02B 23/12 |
| | | | | 359/726 |
| 2004/0179273 A1* | 9/2004 | Ishikawa | .............. | G02B 15/177 |
| | | | | 359/680 |

(Continued)

FOREIGN PATENT DOCUMENTS

| | | |
|---|---|---|
| JP | 2003-107356 A | 4/2003 |
| JP | 2004-212737 A | 7/2004 |

(Continued)

OTHER PUBLICATIONS

Extended European Search Report dated Feb. 21, 2019 in Patent Application No. 1817855.2, 7 pages.

(Continued)

*Primary Examiner* — Evelyn A Lester
(74) *Attorney, Agent, or Firm* — Oblon, McClelland, Maier & Neustadt, L.L.P.

(57) ABSTRACT

The present disclosure relates to a camera module and an electronic apparatus, the camera module includes an imaging device and a lens including a lens group and a light guide member, wherein the light guide member includes a reflective surface and a curved incident surface formed by extending toward an outside of the light guide member, and wherein the reflective surface is used for reflecting external light incident from the incident surface to the imaging device.

10 Claims, 6 Drawing Sheets (56) References Cited

U.S. PATENT DOCUMENTS

2015/0253647 A1* 9/2015 Mercado .............. G02B 13/002
359/708

FOREIGN PATENT DOCUMENTS

KR         10-0683324 B1    2/2007
WO    WO 2010/011789 A2    1/2010

OTHER PUBLICATIONS

1st Office Action issued in corresponding European Patent Application No. 18197855.2 dated Sep. 8, 2021 (5 pages).

* cited by examiner

CAMERA MODULE AND ELECTRONIC APPARATUS

CROSS-REFERENCE TO RELATED APPLICATIONS

This application is based upon and claims priority to Chinese Patent Application No. 201710938101.7, filed on Sep. 30, 2017, the entire contents of which are incorporated herein by reference.

TECHNICAL FIELD

The present disclosure relates to the field of terminal technologies, and in particular, to a camera module and an electronic apparatus.

BACKGROUND

Currently, most electronic apparatuses have built-in camera modules to meet the needs of the user's daily photography. In general, the built-in camera module may include a lens and an imaging device sequentially arranged in a thickness direction of the electronic apparatus. The lens may be used for collecting external light, and the external light after passing through the imaging device forms image information that the user may view on a display interface of the electronic apparatus.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a camera module that includes an imaging device and a lens including a lens group and a light guide member, wherein the light guide member includes a reflective surface and a curved incident surface formed by extending toward an outside of the light guide member, and wherein the reflective surface is used for reflecting external light incident from the incident surface to the imaging device.

According to an aspect, the light guide member further includes a curved exit surface formed to be recessed toward an inside of the light guide member, and the exit surface refracts the external light reflected by the reflective surface to the imaging device.

According to another aspect, the incident surface of the light guide member faces a light entrance of an electronic apparatus, and the external light reflected by the reflective surface faces the lens group.

According to yet another aspect, the lens group includes a first lens group and a second lens group, wherein arrangement directions of the first lens group and the second lens group are perpendicular to each other, the incident surface of the light guide member faces the first lens group, and the external light reflected by the reflective surface faces the second lens group.

In an example, the first lens group is assembled to a predetermined position along a thickness direction of an electronic apparatus, and the arrangement direction of the second lens group and the imaging device is perpendicular to the thickness direction of the electronic apparatus.

In another example, the first lens group has a smaller size than the second lens group.

According to an aspect, the light guide member includes a prism.

According to another aspect, a reflection film is provided on the reflective surface of the light guide member.

According to yet another aspect, the external light is totally reflected on the reflective surface.

Aspects of the disclosure also provide an electronic apparatus that includes the aforementioned camera module.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

The terms used herein are merely for describing a particular aspect, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe information with a term first, second, or third, etc., the information is not limited by these terms. These terms are merely for distinguishing among information of the same kind. For example, without departing from the scope of the present disclosure, first information may also be referred to as second information. Similarly, second information may also be referred to as first information. Depending on the context, a term "if" as used herein can be interpreted as "when", "where" or "in response to".

Figure 1:
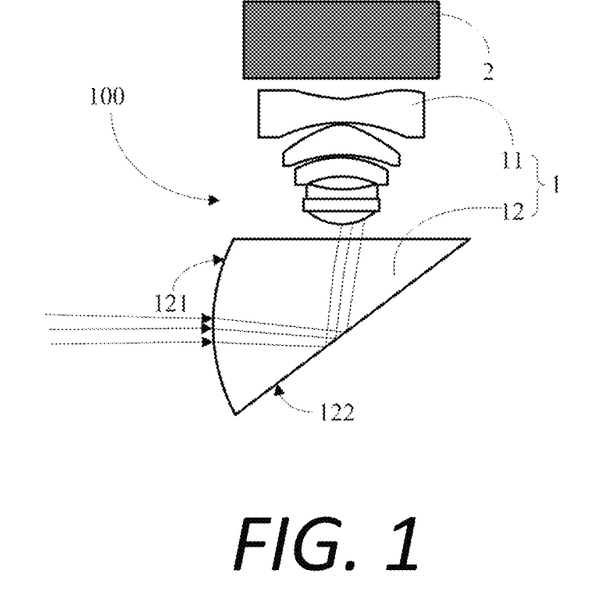
FIG. 1 is a schematic structural diagram of a camera module according to an exemplary aspect of the present disclosure.

FIG. 1 is a schematic structural diagram of a camera module according to an exemplary aspect. As shown in FIG. 1, the camera module 100 may include a lens 1 and an imaging device 2, The imaging device 2 may convert external light captured by the lens 1 into image information that a user can view on the electronic apparatus. The lens 1 may include a lens group 11 and a light guide member 12. The light guide member 12 may include a reflective surface 122 and a curved incident surface 121 formed by extending toward an outside of the light guide member 12. The external light incident from the incident surface 121 may be reflected into the imaging device 2 via the reflective surface 122, Since the incident surface 121 is provided in a curved shape (e.g., spherical shape or aspherical shape), a contact area between the external light and the incident surface 121 is increased, which can obtain a relatively wide angle of view for the camera module 100 and enlarge the shooting scene of the electronic apparatus.

Figure 2:
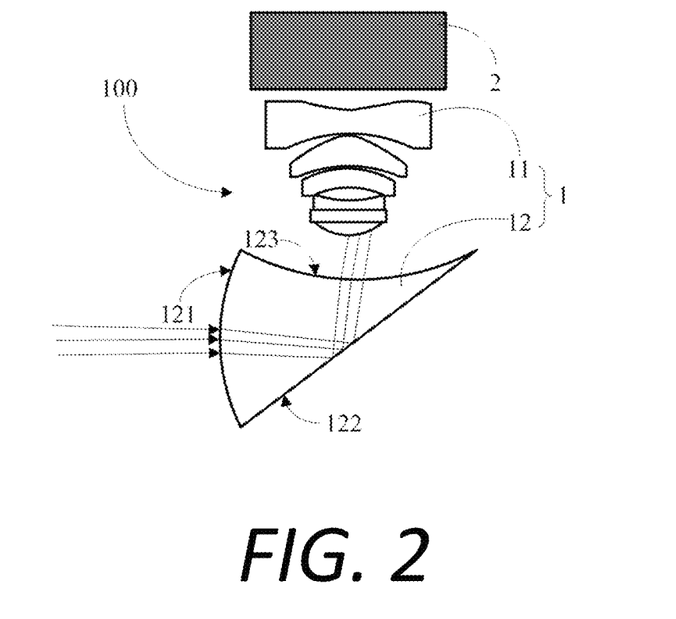
FIG. 2 is a schematic structural diagram of another camera module according to an exemplary aspect of the present disclosure.

Further, as shown in FIG. 2, the light guide member 12 may further include an exit surface 123. The exit surface 123 may be a curved surface that is concave toward the interior of the light guide member 12, so as to refract the external light reflected by the reflective surface 122 to the imaging device 2. The exit surface 123, which is recessed toward the interior of the light guide member 12, can refract the light from the reflective surface 122 to the imaging device 2 as much as possible, so as to increase the amount of light entering.

In this aspect, the lens group 11 may include one or more lenses, and when the lens group 11 includes multiple pieces of lenses, the light convergence capability of the camera can be enhanced, and thus the imaging can be more close to the real. Also, depending on the number of lenses, there are a variety of situations in the arrangement of the light guide member 12 in the present disclosure.

Figure 3:
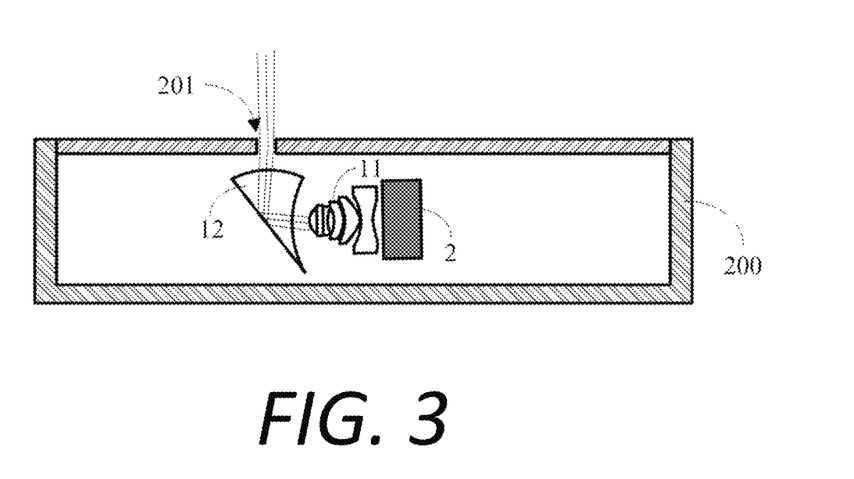
FIG. 3 is an assembly diagram of a camera module and an electronic apparatus according to an exemplary aspect of the present disclosure.

In an aspect, as shown in FIG. 3, the light guide member 12 may be closer to a light entrance 201 of the electronic apparatus 200 than the lens group 11. For example, the incident surface 121 of the light guide member 12 may be disposed toward the light entrance 201 of the electronic apparatus 200, so that the external light refracted by the incident surface 121 may be reflected after entering the reflective surface 122, and the external light reflected by the reflective surface 122 faces the lens group 11.

Because the reflective surface 122 may change a transmission path of the external light, the light guide member 12 and the lens group 11 in the lens 1 may be respectively disposed in different directions of the electronic apparatus 200. For example, still taking the aspect shown in FIG. 3 as an example, the light guide member 12 may be disposed along the thickness direction of the electronic apparatus 200, and the lens group 11 and the imaging device 2 may be disposed in a horizontal direction of the electronic apparatus 200. In this way, by changing the arrangement direction of the camera module 100, the development trend of lightness and thinness of the electronic apparatus 200 is conformed to. In addition, since the incident surface 121 is provided to be curved toward the light entrance 201, the physical size of the light entrance 201 can be reduced when the camera module 100 acquires equal amount of light, which is advantageous for improving a screen occupation ratio of the electronic apparatus 200.

Figure 4:
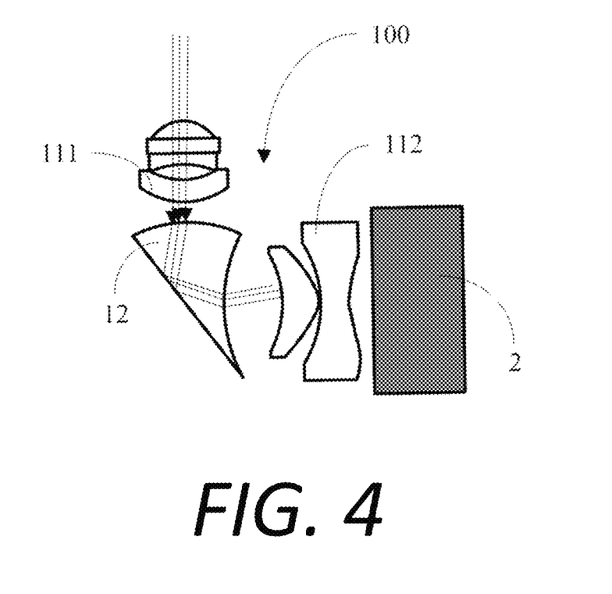
FIG. 4 is a schematic structural diagram of another camera module according to an exemplary aspect of the present disclosure.
Figure 5:
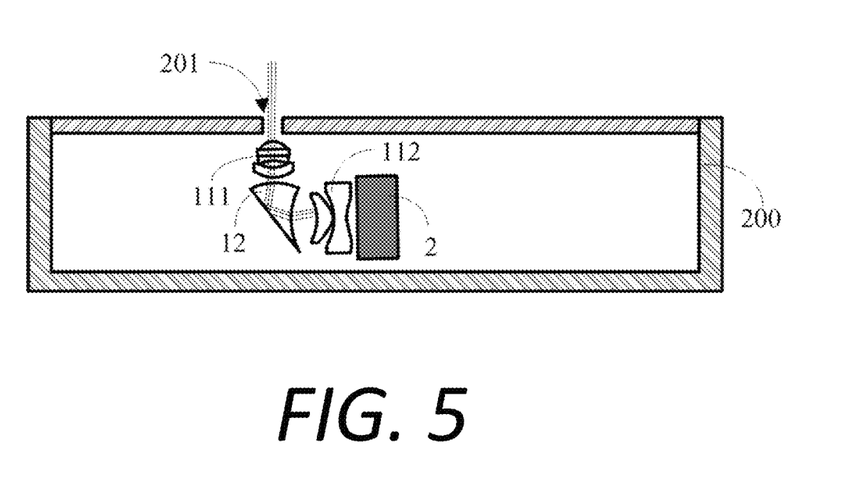
FIG. 5 is an assembly diagram of a camera module and an electronic apparatus according to an exemplary aspect of the present disclosure.

In another aspect, at least a portion of the lens group 11 may be closer to the light entrance 201 of the electronic apparatus 200 than the light guide member 12. For example, as shown in FIG. 4, the lens group 11 may include a first lens group 111 and a second lens group 112. As shown in FIG. 5, the first lens group 111 may be disposed facing the light entrance 201. The external light incident through the first lens group 111 may be refracted by the incident surface 121 of the light guide member 12 onto the reflective surface 122, and the external light reflected by the reflective surface 122 may be directed toward the second lens group 112, so as to guide the external light into the imaging device 2 through the second lens group 112.

Similarly, the first lens group 111 and the second lens group 112 may be disposed in different directions of the electronic apparatus 200 because the reflective surface 122 may change the conduction path of the external light. For example, still taking the aspect shown in FIG. 5 as an example, the first lens group 111 may be disposed along the thickness direction of the electronic apparatus 200, and the second lens group 112 and the imaging device 2 may be disposed along the horizontal direction of the electronic apparatus 200, which is conducive to the thin and light development of the electronic apparatus 200. Further, the size of the first lens group 111 may be smaller than the size of the second lens 112, so as to reduce a proportion of the lens 1 in the thickness direction of the electronic apparatus 200 and improve the screen occupation ratio of the electronic apparatus 200.

Figure 6:
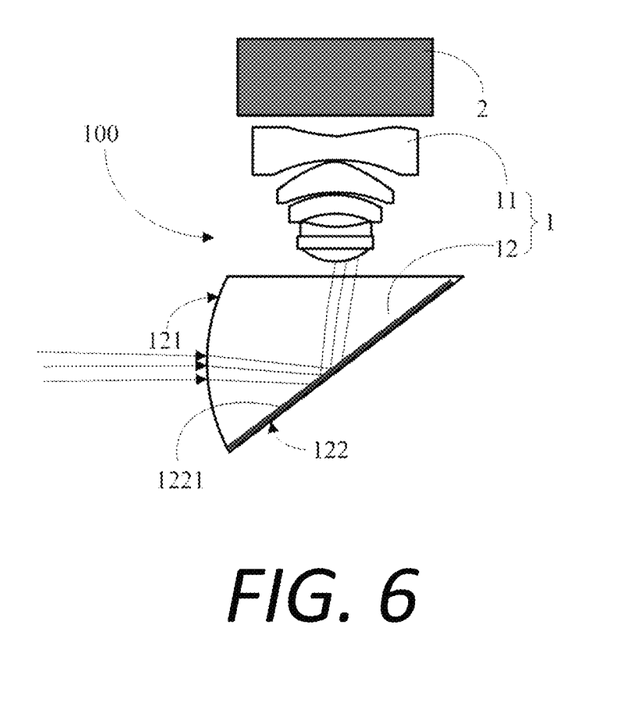
FIG. 6 is a schematic structural diagram of another camera module according to an exemplary aspect of the present disclosure.

In each of the above aspects, the external light may be totally reflected on the reflective surface 122 of the light guide member 12 to minimize the loss of the external light and increase the amount of light entering. For example, as shown in FIG. 6, a reflective film 1221 may be disposed on the reflective surface 122 to increase the reflectivity. The reflective film 1221 may include a metal reflective film (e.g., an aluminum film, a silver film, etc.), a full dielectric reflective film, a metal dielectric reflective film combining the metal reflective film and full dielectric reflective film, or the like, which is not limited by the present disclosure.

Based on the technical solutions of the present disclosure, the light guide member 12 may include a prism, such as a triple prism, and the like, and further may be an isosceles right-angled triple prism, so that a total reflection may occur when the external light is refracted on a hypotenuse of the isosceles right-angled triple prism. The right-angled edges of the isosceles right-angled triple prism may be curved, so as to respectively serve as the incident surface and the exit surface of the light guide member 12, which increases the angle of view of the camera module 100 and meets the shooting needs of the user.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A camera module, comprising:
   an imaging device; and
   a lens including a lens group and a light guide member,
   wherein the light guide member includes a reflective surface and a curved incident surface formed by extending toward an outside of the light guide member, and wherein the reflective surface is used for reflecting external light incident from the incident surface to the imaging device,
   wherein the lens group includes a first lens group and a second lens group, wherein arrangement directions of the first lens group and the second lens group are perpendicular to each other, the incident surface of the light guide member faces the first lens group, and the external light reflected by the reflective surface faces the second lens group, and
   wherein the first lens group has a smaller width than the second lens group.

2. The camera module according to claim 1, wherein the light guide member further includes a curved exit surface formed to be recessed toward an inside of the light guide member, and the exit surface refracts the external light reflected by the reflective surface to the imaging device.

3. The camera module according to claim 1, wherein the light guide member includes a prism.

4. The camera module according to claim 1, wherein the external light is totally reflected on the reflective surface.

5. The camera module according to claim 1, wherein the first lens group is assembled to a predetermined position along a thickness direction of an electronic apparatus, and the arrangement direction of the second lens group and the imaging device is perpendicular to the thickness direction of the electronic apparatus.

6. An electronic apparatus, comprising:
   a camera module comprising:
     an imaging device; and
     a lens including a lens group and a light guide member,
   wherein the light guide member includes a reflective surface and a curved incident surface formed by extending toward an outside of the light guide member, and wherein the reflective surface is used for reflecting external light incident from the incident surface to the imaging device,
   wherein the lens group includes a first lens group and a second lens group, wherein arrangement directions of the first lens group and the second lens group are perpendicular to each other, the incident surface of the light guide member faces the first lens group, and the external light reflected by the reflective surface faces the second lens group, and
   wherein the first lens group has a smaller width than the second lens group.

7. The electronic apparatus according to claim 6, wherein the light guide member further includes a curved exit surface formed to be recessed toward an inside of the light guide member, and the exit surface refracts the external light reflected by the reflective surface to the imaging device.

8. The electronic apparatus according to claim 6, wherein the light guide member includes a prism.

9. The electronic apparatus according to claim 6, wherein the external light is totally reflected on the reflective surface.

10. The electronic apparatus according to claim 6, wherein the first lens group is assembled to a predetermined position along a thickness direction of an electronic apparatus, and the arrangement direction of the second lens group and the imaging device is perpendicular to the thickness direction of the electronic apparatus.

* * * * *